US008442332B2

(12) United States Patent
Morgan et al.

(10) Patent No.: US 8,442,332 B2
(45) Date of Patent: May 14, 2013

(54) BIT PLANE ENCODING/DECODING SYSTEM AND METHOD FOR REDUCING SPATIAL LIGHT MODULATOR IMAGE MEMORY SIZE

(75) Inventors: Daniel J. Morgan, Denton, TX (US); William J. Sexton, The Colony, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1458 days.

(21) Appl. No.: 11/956,456

(22) Filed: Dec. 14, 2007

(65) Prior Publication Data

US 2008/0143747 A1 Jun. 19, 2008

Related U.S. Application Data

(60) Provisional application No. 60/870,633, filed on Dec. 19, 2006.

(51) Int. Cl.
*G06K 9/36* (2006.01)

(52) U.S. Cl.
USPC ........... 382/232; 382/233; 382/250; 382/251; 382/305

(58) Field of Classification Search .................. 382/232, 382/233, 250, 251, 252, 253, 305; 345/555; 708/203; 375/122; 348/384.1, 440
See application file for complete search history.

(56) References Cited

U.S. PATENT DOCUMENTS

| | | | | |
|---|---|---|---|---|
| 4,956,619 | A | 9/1990 | Hornbeck | |
| 6,115,083 | A | 9/2000 | Doherty et al. | |
| 6,310,591 | B1 | 10/2001 | Morgan et al. | |
| 6,570,510 | B2 * | 5/2003 | Chen et al. | 341/51 |
| 7,983,335 | B2 * | 7/2011 | Vajhallya et al. | 375/240 |
| 2005/0078943 | A1 * | 4/2005 | Kimura | 386/68 |
| 2005/0151941 | A1 * | 7/2005 | Solomon | 353/122 |
| 2007/0217356 | A1 * | 9/2007 | Kanno et al. | 370/328 |

* cited by examiner

*Primary Examiner* — Ali Bayat
(74) *Attorney, Agent, or Firm* — Warren L. Franz; Wade J. Brady, III; Frederick J. Telecky, Jr.

(57) ABSTRACT

A bit plane generating system, a method of generating a bit plane and an integrated circuit incorporating the system or the method. In one embodiment, the bit plane generating system includes: (1) a memory configured to store pixel data pertaining to an image to be displayed and (2) bit plane decoding circuitry coupled to the memory and configured to transform the pixel data into at least a portion of a bit plane in accordance with a signal received from a sequence controller.

12 Claims, 9 Drawing Sheets

BIT PLANE ENCODING/DECODING SYSTEM AND METHOD FOR REDUCING SPATIAL LIGHT MODULATOR IMAGE MEMORY SIZE

CROSS-REFERENCE TO RELATED APPLICATION

This application claims priority based on U.S. Provisional Patent Application Ser. No. 60/870,633 filed on Dec. 19, 2006, by Morgan, et al., entitled "Bit Plane Encoding/Decoding System and Method for Reducing Spatial Light Modulator Image Memory Size," commonly owned herewith and incorporated herein by reference.

TECHNICAL FIELD OF THE INVENTION

The invention is directed, in general, to spatial light modulators (SLMs) and, more particularly, to a bit plane encoding/decoding system and method for reducing SLM image memory size.

BACKGROUND OF THE INVENTION

Spatial light modulators are in wide use in display systems and are increasingly being used because they offer the benefit of high resolution while consuming lower power and being less bulky than conventional cathode ray tube (CRT) technology. One type of SLM display is the digital micro-mirror device (DMD). A DMD "chip" typically has an array of small reflective surfaces (mirrors) located on a semiconductor wafer to which electrical signals are applied to deflect the mirrors and change direction of the reflected light applied to the device. A DMD-based display system is created by projecting a beam of light to the device, selectively altering the orientations of the individual micro-mirrors with image data, and directly viewing or projecting the selected reflected portions to an image plane, such as a display screen. Each individual micro-mirror is individually addressable by an electronic signal and makes up one "display element" of the image. These micro-mirrors are often referred to as picture elements or "pixels," which may or may not correlate directly to the pixels of an image. This use of terminology is typically clear from context, so long as it is understood that more than one pixel of the SLM array may be used to generate a pixel of the displayed image.

Generally, projecting an image from an array of DMD pixels is accomplished by loading memory cells connected to the pixels. Once each memory cell is loaded, the corresponding pixels are reset so that each one tilts in accordance with the ON or OFF state of the data in the memory cell. For example, to produce a bright spot in the projected image, the state of the pixel may be ON, such that the light from that pixel is directed out of the SLM and into a projection lens. Conversely, to produce a dark spot in the projected image, the state of the pixel may be OFF, such that the light is directed away from the projection lens.

Modulating the beam of light with a micro-mirror is used to vary the intensity of the reflected light, such as through Pulse-Width Modulation (PWM). Although the micro-mirrors can be moved relative to the bias voltage applied, the typical operation is a digital bi-stable mode in which the mirrors are fully deflected at any one time. Generating short pulses and varying the duration of the pulse to an image bit changes the time in which the portion of the image bit is reflected to the image plane versus the time the image bit is reflected away, therefore distributing the correct amount of light to the image plane.

The above-described pulse-width modulation techniques may be used to achieve varying levels of illumination in both black/white and color systems. For generating color images with SLMs, one approach is to use three DMDs: one for each additive primary color of red, green and blue (RGB). The light from corresponding pixels of each DMD is converged so that the viewer perceives the desired color. Another approach is to use a single DMD and a color wheel having sections of primary colors. Data for different colors is sequenced and synchronized to the color wheel so that the eye integrates sequential images into a continuous color image. Another approach uses two DMDs, with one switching between two colors and the other displaying a third color.

A PWM scheme is determined by using the display rate at which images are presented to the viewer and the number of intensity levels available by the display system. The display system rate is the time that the image frame is available for viewing. For example, a standard television signal is transmitted at 30 frames per second (fps), which is a frame time of 33.3 milliseconds. For a system having n bits of resolution, the image has $2^n$ levels of intensity. Thus, if the system has four bits of intensity resolution, 16 levels of intensity can result. To create the perception of an intensity level in PWM systems, the frame is divided into equal time slices; each of which displays a quantized intensity. For a system having n bits of intensity resolution, the frame is divided into $2^{n-1}$ equal time slices. After the image element intensity is quantized, a black value, 0, would contain no intensity and be equivalent to zero time slices, while the maximum brightness level would have the display element on for all, or $2^{n-1}$, of the time slices.

An established method to get the time slices into a display frame is to format the data into "bit planes" where each bit plane corresponds to a bit weight of the intensity value. A system with four bits of intensity resolution (i.e., n=4) would have four bit planes and each bit plane would be weighted with an appropriate number of time slices. In an example binary weighted system, the $2^0$ bit or least significant bit (LSB) would have one time slice, the $2^1$ bit or next significant bit would have two time slices, the $2^2$ bit or next significant bit would have four time slices, and the $2^3$ bit or most significant bit (MSB) would have eight time slices. By displaying all of the bit planes within a frame, any of the capable intensity levels can be created in this weighted method. The quality of the image produced by the DMD generally increases as a function of the number of bit planes per pixel. Currently, 84 bit planes per pixel are seen as producing acceptably low image artifacts. In general, the more bit planes per pixel, the lower the number of artifacts.

Given the number of pixels in a typical DMD and given the number of bit planes required to deliver the desired color depth, a significant amount of memory is required to store the bit planes required to generate a particular frame. In fact, the largest amount of memory is needed for "formatting" the image into bit plane format the DMD requires. Fortunately, dynamic random access memory (DRAM), which is the type of memory desired for this use, is relatively inexpensive. Unfortunately, commercially available DRAM chips come in standard modules that have far more storage capacity than required to contain the bit planes. For example, today's commercially available external DRAM chips can store 512 Mbits; a typical DMD requires only about 100 Mbits.

Since DMDs need significantly less DRAM than commercially available modules offer, it seems reasonable to produce a single integrated circuit (IC) containing not only the image processing and control circuitry, but the image memory a DMD requires. However, commercially available DRAM chips are available at commodity prices. Even though the embedded DRAM would have a lower storage capacity (e.g., 100 Mbits) than the external DRAM, embedding DRAM with the image processing and control circuitry requires extra process steps and area, adding complexity, potentially reducing yield and therefore increasing the cost of the IC chip. Thus, it has not been cost-effective to embed the DRAM.

However, if the DMD's image memory size can be reduced, the DRAM can be reduced. At some point, it becomes cost-effective to embed the DRAM. Thus, what is needed in the art is a way to reduce DMD image memory size so embedding becomes economically feasible. More generally, what is needed in the art is a bit plane encoding/decoding system and method for reducing SLM image memory size.

SUMMARY OF THE INVENTION

To address the above-discussed deficiencies of the prior art, the invention provides, in one aspect, a bit plane generating system. In one embodiment, the bit plane generating system includes: (1) a memory configured to store pixel data pertaining to an image to be displayed and (2) bit plane decoding circuitry coupled to the memory and configured to transform the pixel data into at least a portion of a bit plane in accordance with a signal received from a sequence controller.

In another aspect, the invention provides a method of generating a bit plane. In one embodiment, the method includes: (1) storing pixel data pertaining to an image to be displayed in a memory, (2) receiving a signal from a sequence controller pertaining to at least a portion of a bit plane to be displayed and (3) transforming the pixel data into the at least the portion of the bit plane in accordance with the signal.

In yet another aspect, the invention provides an IC. In one embodiment, the IC includes: (1) DRAM configured to store pixel data for a DMD and (2) bit plane decoding circuitry coupled to the DRAM.

The foregoing has outlined some aspects of the invention so that those skilled in the pertinent art may better understand the detailed description of the invention that follows. Various embodiments of the invention will be described hereinafter that form the subject of the claims of the invention. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1A:
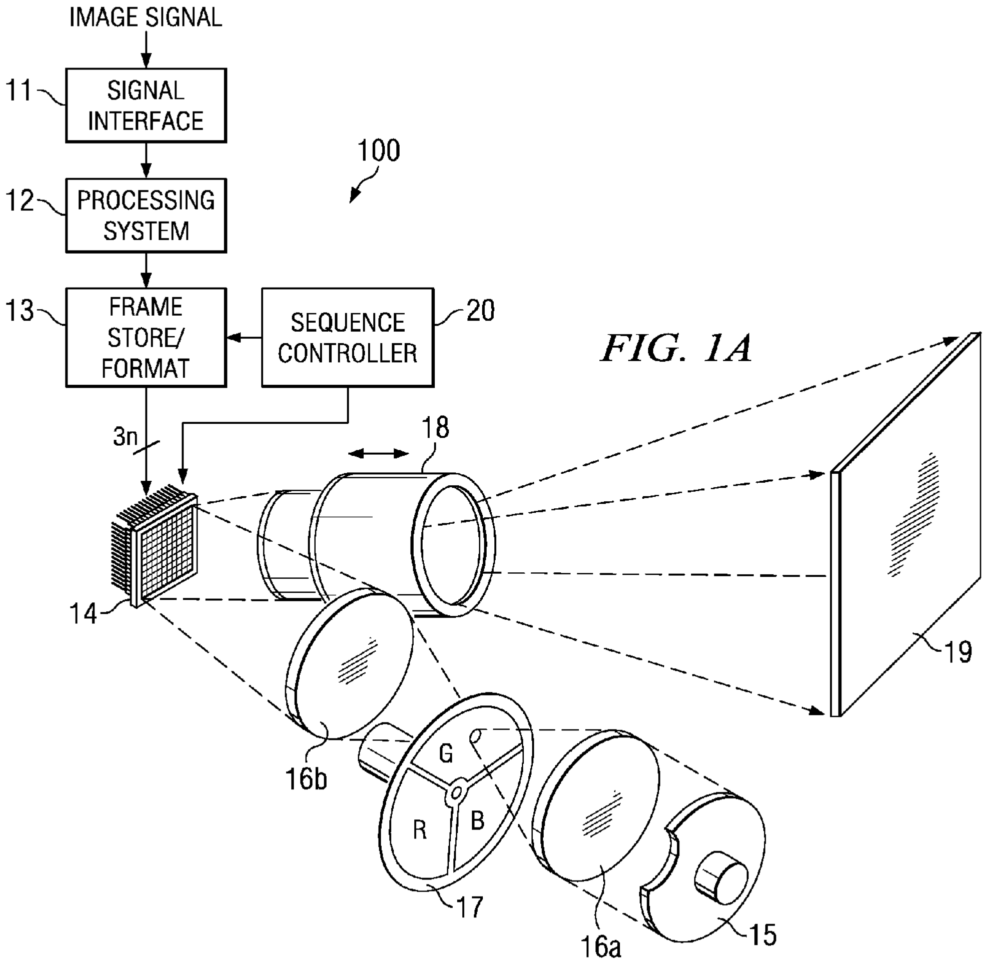
FIG. 1A illustrates one embodiment of a projection visual display system, which uses an SLM having a DMD therein to generate real-time images from an input image signal.

FIG. 1A illustrates one embodiment of a projection visual display system 100, which uses an SLM having a DMD 14 therein to generate real-time images from an input image signal. The input image signal may be from a television tuner, Motion Picture Experts Group (MPEG) decoder, video disc player, video cassette player, personal computer (PC) graphics card or the like. Only those components significant to main-screen pixel data processing are shown. Other components, such as might be used for processing synchronization and audio signals or secondary screen features, such as closed captioning, are not shown for simplicity's sake.

A white light source 15 shines (typically white) light through a concentrating lens 16*a*, a color wheel 17 and a collimating lens 16*b*. The light, now being colored as a function of the position of the color wheel 17, reflects off a DMD 16 and through a lens 18 to form an image on a screen 19.

In the illustrated embodiment, the input image signal, which may be an analog or digital signal, is provided to a signal interface 11. In embodiments where the input image signal is analog, an analog-to-digital (A/D) converter (not illustrated) may be employed to convert the incoming signal to a digital data signal. The signal interface 11 receives the data signal and separates video, synchronization and audio signals. In addition, a Y/C separator is also typically employed, which converts the incoming data from the image signal into pixel-data samples, and which separates luminance (Y) data from chrominance (C) data, respectively. Alternatively, in other embodiments, Y/C separation could be performed before A/D conversion.

The separated signals are then provided to a processing system 12. The processing system 12 prepares the data for display by performing various pixel data processing tasks. The processing system 12 may include whatever processing components and memory useful for such tasks, such as field and line buffers. The tasks performed by the processing system 12 may include linearization (to compensate for gamma correction), colorspace conversion, and interlace to progressive scan conversion. The order in which any or all of the tasks performed by the processing system 12 may vary.

Once the processing system 12 is finished with the data, a frame store/format module 13 receives processed pixel data from the processing system 12. The frame store/format module 13 formats the data, on input or on output, into bit plane format and delivers the bit planes to the DMD 14. The bit plane format permits single or multiple pixels on the DMD 14 to be turned on or off in response to the value of one bit of data, in order to generate one layer of the final display image. In one embodiment, the frame store/format module 13 is a "double buffer" memory, which means that it has a capacity for at least two display frames. In such a module, the buffer for one display frame may be read out to the SLM while the buffer for another display frame is being written. To this end, the two buffers are typically controlled in a "ping-pong" manner so that data is continually available to the SLM.

For the next step in generating the final desired image, the bit plane data from the frame store/format module 13 is delivered to the SLM. Although this description is in terms of an SLM having a DMD 14 (as illustrated), other types of SLMs could be substituted into the display system 100. Details of a suitable SLM are set out in U.S. Pat. No. 4,956,619, entitled "Spatial Light Modulator," which is commonly owned with this disclosure. In the case of the illustrated DMD-type SLM, each piece of the final image is generated by one or more pixels of the DMD 14, as described above. Generally, the SLM uses the data from the frame store/format module 13 to address each pixel on the DMD 14. The "ON" or "OFF" state of each pixel forms a black or full-intensity color (R, G or B) piece of the final image, and an array of pixels on the DMD 14 is used to generate an entire image frame. Each pixel displays data from each bit plane for a duration proportional to each bit's PWM weighting, which is proportional to the length of time each pixel is ON, and thus its intensity in displaying the image. In the illustrated embodiment, each pixel of the DMD 14 has an associated memory cell to store its instruction bit from a particular bit plane.

For each frame of the image to be displayed in color, red, green, blue (RGB) data may be provided to the DMD 14 one color at a time, such that each frame of data is divided into red, blue and green data segments. Typically, the display time for each segment is synchronized to an optical filter, such as the color wheel 17, which rotates so that the DMD 14 displays the data for each color through the color wheel 17 at the proper time. Thus, the data channels for each color are time-multiplexed so that each frame has sequential data for the different colors.

In an alternative embodiment, the bit planes for different colors could be concurrently displayed using multiple SLMs, one for each color component. The multiple color displays may then be combined to create the final display image on the screen 19. Of course, a system or method employing the principles disclosed herein is not limited to either embodiment.

Also illustrated in FIG. 1A is a sequence controller 20 associated with the frame store/format module 13 and the DMD 14. The sequence controller 20 provides reset control signals to the DMD 14, as well as load control signals to the frame store/format module 13. An example of a suitable sequence controller is described in U.S. Pat. No. 6,115,083, entitled "Load/Reset Sequence Controller for Spatial Light Modulator," which is commonly owned with this disclosure.

Figure 1B:
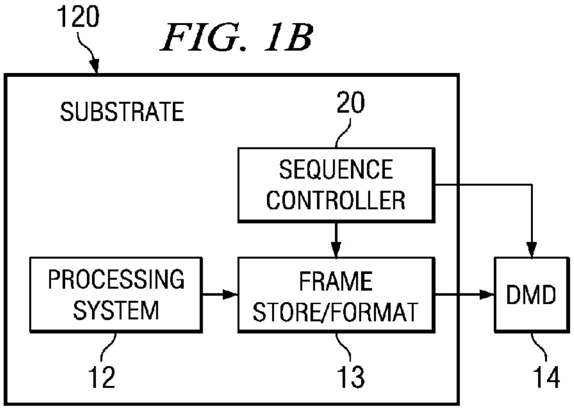
FIG. 1B illustrates a highly schematic block diagram of one embodiment of an IC in which DRAM is embedded with a processing system, a frame store/format module and a sequence controller.

FIG. 1B illustrates a highly schematic block diagram of one embodiment of an IC in which DRAM is embedded with the processing system 12, the frame store/format module 13 and the sequence controller 20. A common substrate 120 supports an IC that includes at least some of the DRAM associated with the frame store/format module 13 and bit plane decoding circuitry (e.g., a raster decoder) associated with the frame store/format module 13. In another embodiment, the IC also includes a raster encoder associated with the frame store/format module 13. In the embodiment of FIG. 1B, the IC includes the processing system 12, the frame store/format module 13 in its entirety and the sequence controller 20 which, jointly controls the frame store/format module 13 and the DMD 14. In an alternative embodiment, the IC includes the DMD 14 and at least a portion of one or more of the processing system 12, frame store/format module 13 and sequence controller 20.

Several advantages may be realized with embedded DRAM as opposed to external DRAM. Embedded DRAM allows the SLM system to use a smaller printed circuit board (PCB), saving the cost of the PCB area and associated assembly costs. This especially benefits smaller projectors, such as light-emitting diode (LED) projectors. Embedded DRAM eliminates special clock generator chips needed with high performance external DRAMs such as those based on Rambus® technology. This saves cost and PCB space, too. Electromagnetic interference (EMI) is also reduced as the number of external DRAM address, data and control buses is reduced. External DRAM chips often become obsolete or sole-source items, which increases their price. Embedded DRAM eliminates this problem. Since embedded DRAM can use very wide buses for reading at little or no additional cost, DMD load times can be improved, improving overall SLM system performance by reducing image artifacts.

Having described in general an exemplary SLM-based projection visual display system and a DMD IC containing embedded DRAM, various embodiments of a system for reducing SLM image memory size such that embedding DRAM becomes economically viable will now be described. The embodiments employ various techniques that avoid having to store the bit planes. Instead, encoded pixel data is stored, and bit planes are created from the encoded pixel data as needed, which may colloquially be referred to as "on-the-fly," to drive the DMD. Thus, pixel data is not bit planes, and bit planes are not pixel data. With the teachings herein, those skilled in the pertinent art will understand that the concept of storing data other than the bit planes and generating the bit planes "on-the-fly" from that data may be carried out in many different ways. Although only a few of those ways will be illustrated herein, the invention encompasses all such ways.

The illustrated embodiments are sufficiently flexible to operate in a variety of SLM-based projection visual display systems that are more sophisticated than that shown in FIG. 1A. For example, some systems may have color wheels with segments in addition to R, G and B; the color wheels may have white (W) segments, or secondary color segments, such as yellow, magenta or cyan segments. Some systems may have color wheels with neutral density segments to increase color depth. Some systems may continue to display while color wheel spokes pass between the light source and the DMD; in such case neighboring segments cooperate to form segments of secondary or higher-order colors. Some systems may have light sources (such as xenon arc lamps) that require maintenance, which may take the form of high-amperage pulses. Some systems may have light sources that dim or change color slightly as they age. In more sophisticated SLM systems, all of these variations have an impact upon the bit planes that are provided to the DMD to produce the desired colors on the screen.

Figure 2:
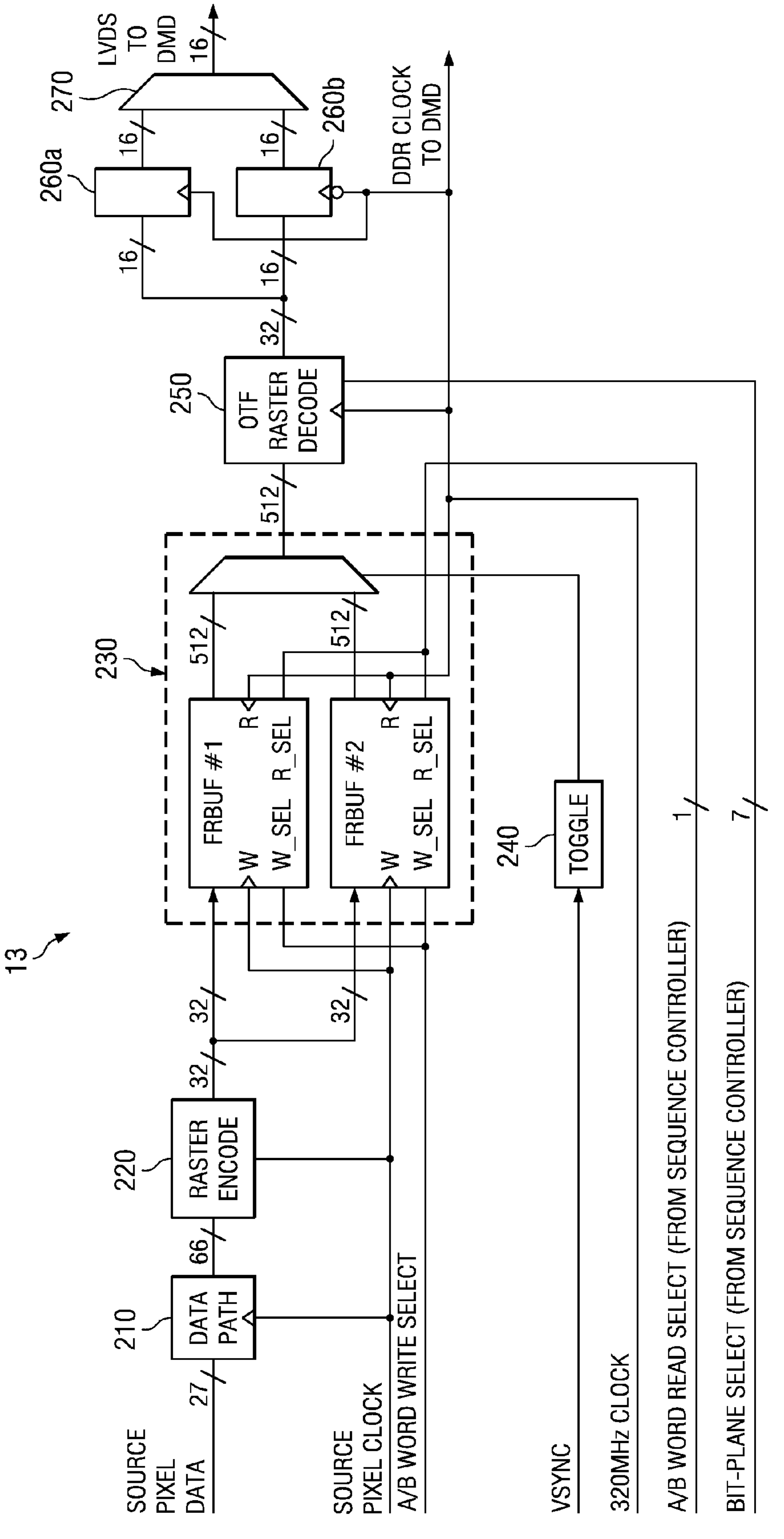
FIG. 2 illustrates a block diagram of one embodiment of a bit plane generating system for reducing SLM image memory size constructed according to the principles of the invention.

FIG. 2 illustrates a block diagram of one embodiment of a bit plane generating system for reducing SLM image memory size constructed according to the principles of the invention. Source pixel data (that is 27 bits wide in the illustrated embodiment) is provided to data path circuitry 210 associated with the processing system 12 of FIG. 1A. The data path circuitry 210 formats the source pixel data into bit planes for non-RGB data and into a compressed word format for R, G and B and provides them on a bus (that is 66 bits wide in the illustrated embodiment) as shown. The R, G and B buses may be compressed by the natural operation of the Spatial-Temporal Multiplexing function (see, e.g., U.S. Pat. No. 6,310,591, which issued on Oct. 30, 2001, to Morgan, et al., entitled "Spatial-temporal Multiplexing for High Bit-depth Resolution Displays," incorporated herein by reference) performed in the data path. If the STM data is used in a bus index form, prior to being expanded into bit planes via a non-binary look-up table, then it performs a natural compression. The bit planes include W segment bit planes, secondary segment bit planes, "pulse" bit planes employed during delivery of a maintenance pulse to the light source, and "spoke" bit planes employed while color wheel spokes pass between the light source and the DMD. In the prior art, all of these bit planes were delivered to and stored in external DRAM (not shown) and retrieved as necessary to drive the DMD. However, as has been described, this required the DRAM to be of such size that embedding it was not economically viable.

Instead, this embodiment of the invention calls for the data path circuitry 210 to deliver the bit planes to a raster encoder 220 (using a 32-bit bus in the illustrated embodiment). The raster encoder 220 transforms the bit planes into raster-encoded pixel data that requires less memory (32 bits per pixel in the illustrated embodiment) to store than would have the corresponding bit planes. This encoding process is a form of lossless compression. The raster-encoded pixel data is stored in a double frame buffer 230.

A vertical synchronization (VSYNC) signal drives a toggle circuit 240 that acts as a selector with respect to the double frame buffer 230. The output of the double frame buffer 230 is provided on a relatively wide bus (512 bits wide in the illustrated embodiment) to an OTF decoder 250. If the double frame buffer 230 is embedded with the DMD 14, a relatively wide bus (e.g., 128 bits or more) is straightforward to provide. Buses on the order of that width are impractical with external DRAMs.

The OTF decoder 250 transforms the raster-encoded pixel data back into bit planes, delivering them in (e.g., 32-bit) portions to buffers 260*a*, 260*b* that are each one word, or 16 bits wide, in the illustrated embodiment. This conversion back into bit planes is a lossless decompression. A multiplexer (mux) 270 then selects between the buffers 260*a*, 260*b*, causing them to be delivered to the DMD in (e.g., 32-pixel) phases (both edges of the clock are used at the DMD) to effect an updating of the DMD. Certain, more specific, embodiments of the raster encoder 220, the double frame buffer 230, and the OTF raster decoder 250 will now be described.

Figure 3A:
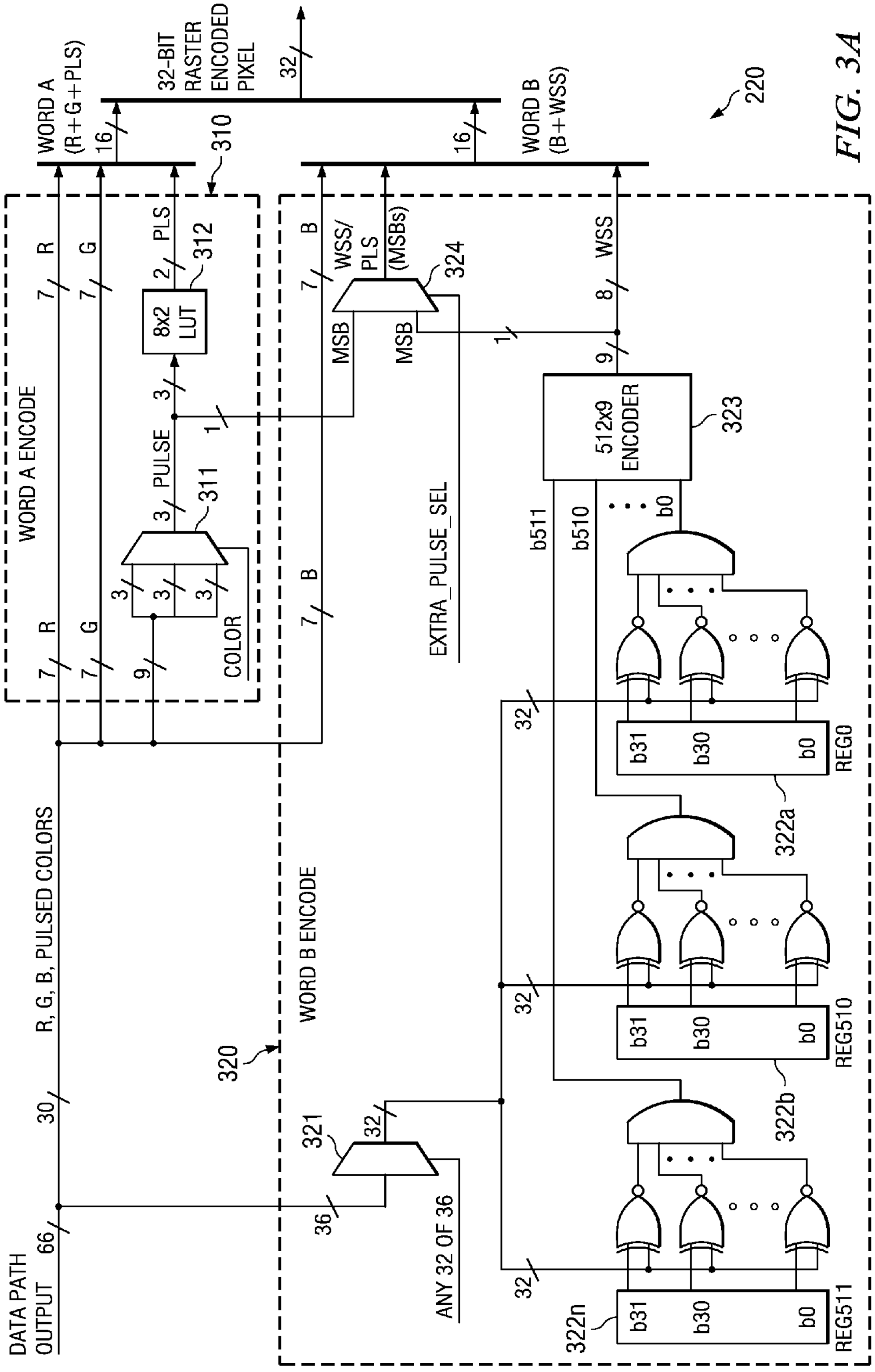
FIG. 3A illustrates a more detailed block diagram of one embodiment of the raster encoder of FIG. 2.

FIG. 3A illustrates a more detailed block diagram of one embodiment of the raster encoder 220 of FIG. 2. As previously described, the raster encoder receives compressed R, G and B data, and also non-RGB bit planes, via a bus (not referenced) that is, in the illustrated embodiment, 66 bits wide. Twenty-three of those 66 bits are attributable to R (seven bits), G (seven bits) and pulse (nine bit planes) and are delivered to a Word A Encode block 310. The remaining 43 bits are attributable to B, W, spoke and secondary color segments and are delivered to a Word B Encode block 320. The allocation of bit planes between the Word A and B Encode blocks causes their respective outputs to be 16 bits apiece. However, this allocation may change without departing from the scope of the invention.

In FIG. 3A, the Word A Encode block 310 passes the 14 bits attributable to the R and G bits through as shown. The nine bits attributable to the pulse bit planes are provided in groups of three bits to a mux 311. Depending upon the SLM system, the light source is pulsed only during one of the primary R, G and B segments. Nine bits are required to anticipate all three possibilities; only three bits are needed in a given SLM system. Six bits being unnecessary, the mux 311 selects one of the three three-bit groups based on the value of a setting, "Color," programmed during configuration of the frame store/format module 13 of FIG. 1A. The selected three-bit group is provided to an 8×2 look-up table (LUT) 312 that yields a two-bit value, "PLS," representing the pulse bit planes. Those skilled in the art will see that some resolution is lost in this down-selection from three bits to two. However, this resolution is either insignificant in the context of a particular SLM system or is significant and can be retained by changing a configuration setting as will be described below. The output of the Word A Encode block 310 is thus a 16-bit "Word A."

The Word B Encode block 320 passes the seven bits attributable to the B bit planes through as shown. The remaining 36 bits, attributable to the W, spoke and secondary color bit planes, are provided to a mux 321. Currently, no SLM systems have a color wheel that includes all possible segments. Thirty-six bits are required to anticipate all segments possibilities; only thirty-two bits are needed in a given SLM system. Four bits being unnecessary, the mux 321 selects 32 of the 36 bits based on the value of a setting, "Any 32 of 36," programmed during configuration of the frame store/format module 13 of FIG. 1A. The selected 32 bits are then mapped onto 512 bits by means of 512 32-bit registers Reg0 322*a*, . . . , Reg510 322*b*, Reg511 322*n*. A 32-bit bus (shown but not referenced) is common to all 512 32-bit registers Reg0 322*a*, . . . , Reg510 322*b*, Reg511 322*n*. The contents of each 32-bit register Reg0 322*a*, . . . , Reg510 322*b*, Reg511 322*n* is programmed during configuration of the frame store/format module 13 of FIG. 1A. Each 32-bit register Reg0 322*a*, . . . , Reg510 322*b*, Reg511 322*n* provides a single bit based on all 32 bits provided to it. The single bit acts as a flag to indicate if the stored value in the register matches the 32-bit bus. Thus the 512 32-bit registers Reg0 322*a*, . . . , Reg510 322*b*, Reg511 322*n* together work as a 1 digital comparator.

The resulting 512 bits are provided to a 512×9 LUT encoder 323. Only one of the 512 bits will be high for each pixel. The most significant bit (MSB) of the resulting nine bits is diverted, along with the MSB of the three-bit group selected by the 8×2 LUT 312, to a mux 324, which selects one of the two MSBs based on the value of a setting, "Extra_Pulse_SEL," programmed during configuration of the frame store/format module 13 of FIG. 1A. In this manner, the resolution of the pulse bit planes or the W, spoke and secondary color bit planes may be restored. Alternatively, if more than 256 states are needed in the Word B Encode block 320, the full nine bits are needed, and the added resolution of the pulse bit planes is not available. The output of the Word B Encode block 320 is thus a 16-bit "Word B." Together, Word A and Word B concatenate to form 32-bit, raster-encoded pixel data, which is provided to the double frame buffer 230 of FIG. 2.

Figure 3B:
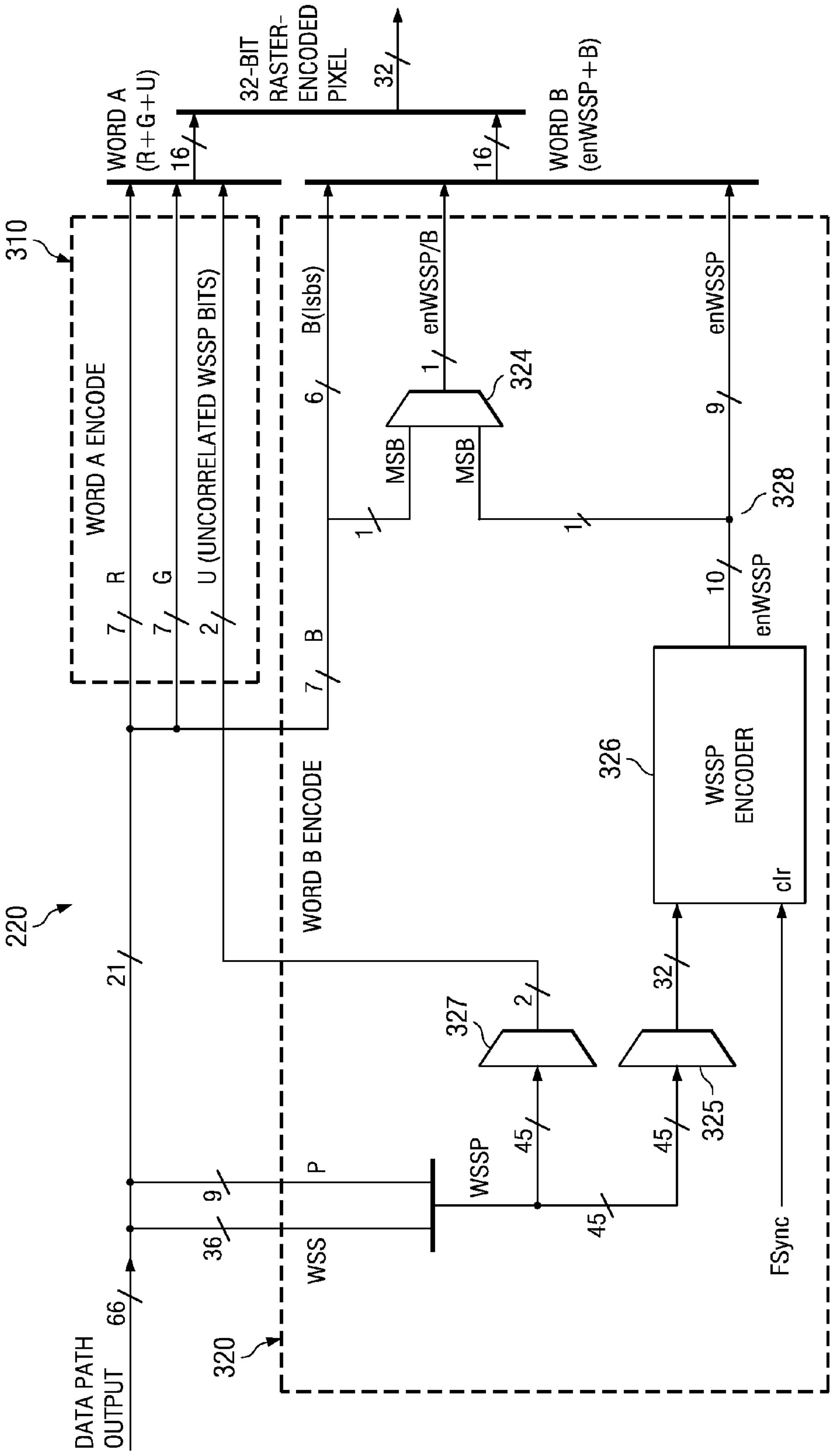
FIG. 3B illustrates a more detailed block diagram of another embodiment of the raster encoder of FIG. 2.

FIG. 3B illustrates a more detailed block diagram of another embodiment of the raster encoder 220 of FIG. 2. As with the raster encoder of FIG. 3A, the raster encoder of FIG. 3B receives compressed R, G and B data, and also non-RGB bit planes, via a bus (not referenced) that is, in the illustrated embodiment, 66 bits wide. Twenty-one of those 66 bits are attributable to R (seven bits), G (seven bits) and B (seven bits) and, as before, the R and G bits are delivered to a Word A Encode block 310, and the B bits are delivered to a Word B Encode block 320. The remaining 45 bits are attributable to W, spoke, secondary and pulse color segments and are delivered to a Word B Encode block 320. As with the embodiment of FIG. 3A, the allocation of bit planes between the Word A and B Encode blocks causes their respective outputs to be 16 bits apiece. Again, however, this allocation may change without departing from the scope of the invention.

A mux 325 selects up to 32 of the 45 bits based on the value of a setting (not shown) programmed during configuration of the frame store/format module 13 of FIG. 1A and provides the 32 bits to a WSSP encoder 326. A mux 327 additionally selects two of the 45 bits (also based on the value of a setting programmed during configuration of the frame store/format module 13 of FIG. 1A) to remove from compression by the WSSP encoder 326. These two bits happen to correspond to bit planes that are least amenable to compression by the WSSP encoder 326 and are instead provided to the Word A Encode block 310 as shown. An off-line computer-aided design (CAD) tool (not shown) may be used to select which two bits to remove from compression.

Removing these two bits from the bits to be compressed reduces the total number of states created by the WSSP encoder 326. In the illustrated embodiment, the number of encoded WSSP states is reduced to at most 1024, allowing them to be communicated on a 10-bit output bus 328. The WSSP encoder 326 maps the 32 bits selected by the mux 325 onto at most 1024 bits and therefore operates like the 32-bit registers Reg0 322*a*, . . . , Reg510 322*b*, Reg511 322*n* of FIG. 3A. The most significant bit (MSB) of the output of the WSSP encoder 326 is diverted, along with the MSB of the seven B bits, to a mux 324, which selects one of the two MSBs based on the value of a setting (not shown) programmed during configuration of the frame store/format module 13 of FIG. 1A. The output of the Word A Encode block 310 is a 16-bit "Word A," and the output of the Word B Encode block 320 is a 16-bit "Word B." Together, Word A and Word B concatenate to form 32-bit, raster-encoded pixel data, which is provided to the double frame buffer 230 of FIG. 2.

A key to allowing lossless compression in the embodiments of FIGS. 3A and 3B is the fact that, although up to $2^{32}$ possible encoder states are needed in theory, a practical system needs far fewer states. A typical system needs fewer than 512 states. Recognition of this fact allows 32 bit planes to be losslessly compressed into, e.g., just nine bits (or even eight bits) per pixel.

Figure 4:
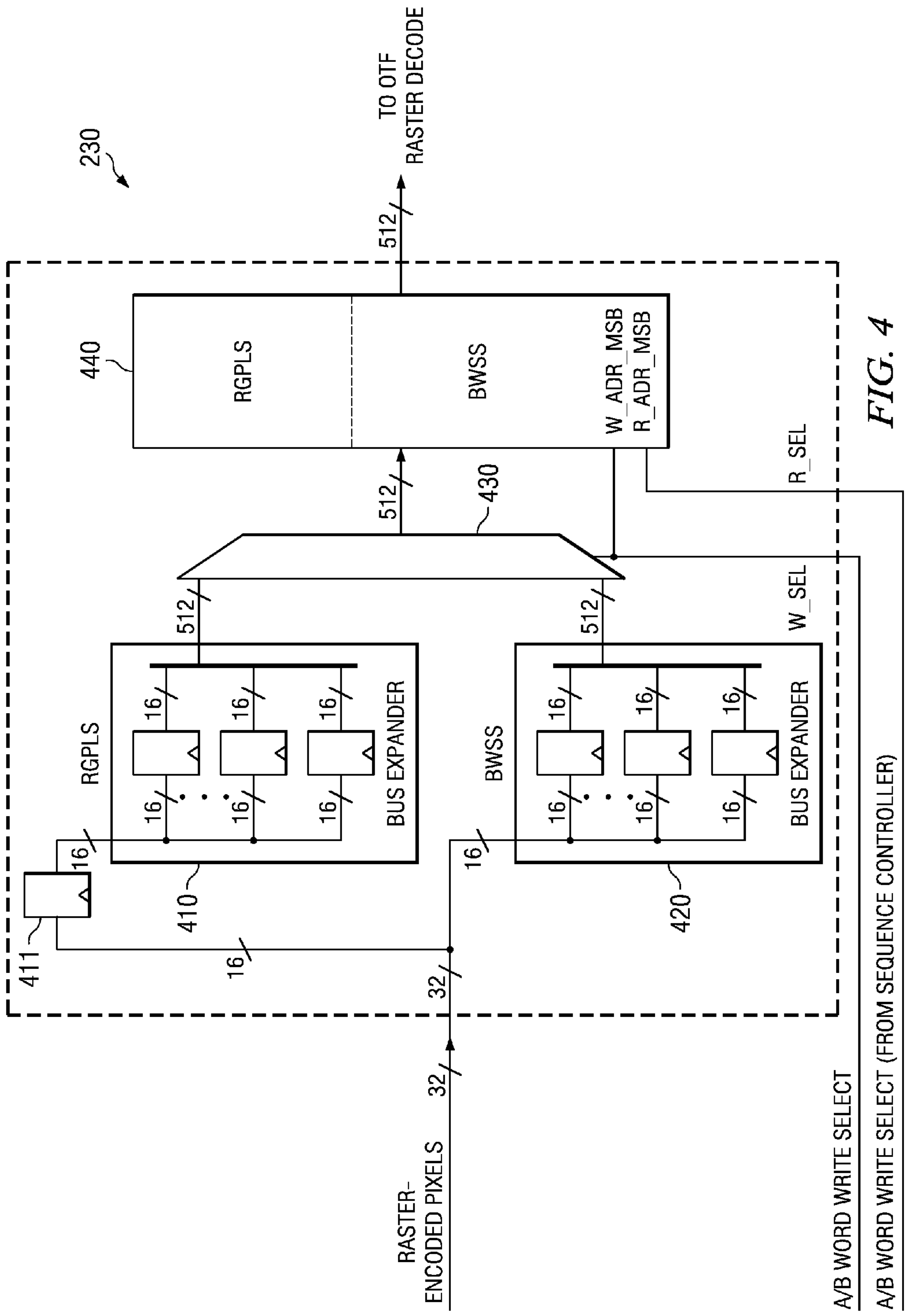
FIG. 4 illustrates a more detailed block diagram of one embodiment of the double frame buffer of FIG. 2.

FIG. 4 illustrates a more detailed block diagram of one embodiment of the double frame buffer 230 of FIG. 2. Within this embodiment of the double frame buffer 230, the 32-bit, raster-encoded pixel data is again split into a Word A and a Word B. In the context of FIG. 4, Word A is called a "RGPLS" (i.e., Red, Green, Pulse) Word, and Word B is called a "BWSS" (i.e., Blue, White, Segment, Secondary Color) Word. Called such, they happen to correspond to the words produced by the Raster encoder 220 of FIG. 3A, but could, with a simple renaming, correspond to the words produced by the Raster encoder 220 of FIG. 3B. The RGPLS Word is provided to an RGPLS buffer 410, and the BWSS Word is provided to a BWSS buffer 420. The RGPLS buffer 410 and the BWSS buffer 420 serve as bus expanders, aggregating the 32-bit, raster-encoded pixel data until it reaches 512 bits in width (amounting to 16 pixels). Then, under control of an A/B Word Write Select signal, a mux 430 toggles between selecting and loading the contents of the RGPLS buffer 410 and the BWSS buffer 420 into a DRAM 440. A register 411 delays the RGPLS Word so that the 512-bit outputs of the RGPLS buffer 410 and the BWSS 420 are misaligned as they are loaded into the DRAM 440; the bus-expanded Word A and Word B are written as 512-bit words but one clock apart in time. It should be noted that the storage capacity of the DRAM 440 is reduced by virtue of the invention; its size may be less than 40 Mbits. The DRAM 440 provides 16-bit raster-encoded pixels in groups of 32 pixels, as needed, to the OTF raster decoder 250 of FIG. 2.

It should be noted that partitioning Word A and Word B means that, when pixels are read attendant to on-the-fly decoding, only half of a pixel is read (16 bits per pixel rather than 32). This is done to help reduce memory bandwidth. So while the data is read as raster-scan data, it is read as only half-pixels rather than full 32-bit pixels. Thirty-two pixels can be read in parallel, rather than just 16. As a result, more pixels are decoded in parallel, doubling the bandwidth of the decode.

Figure 5:
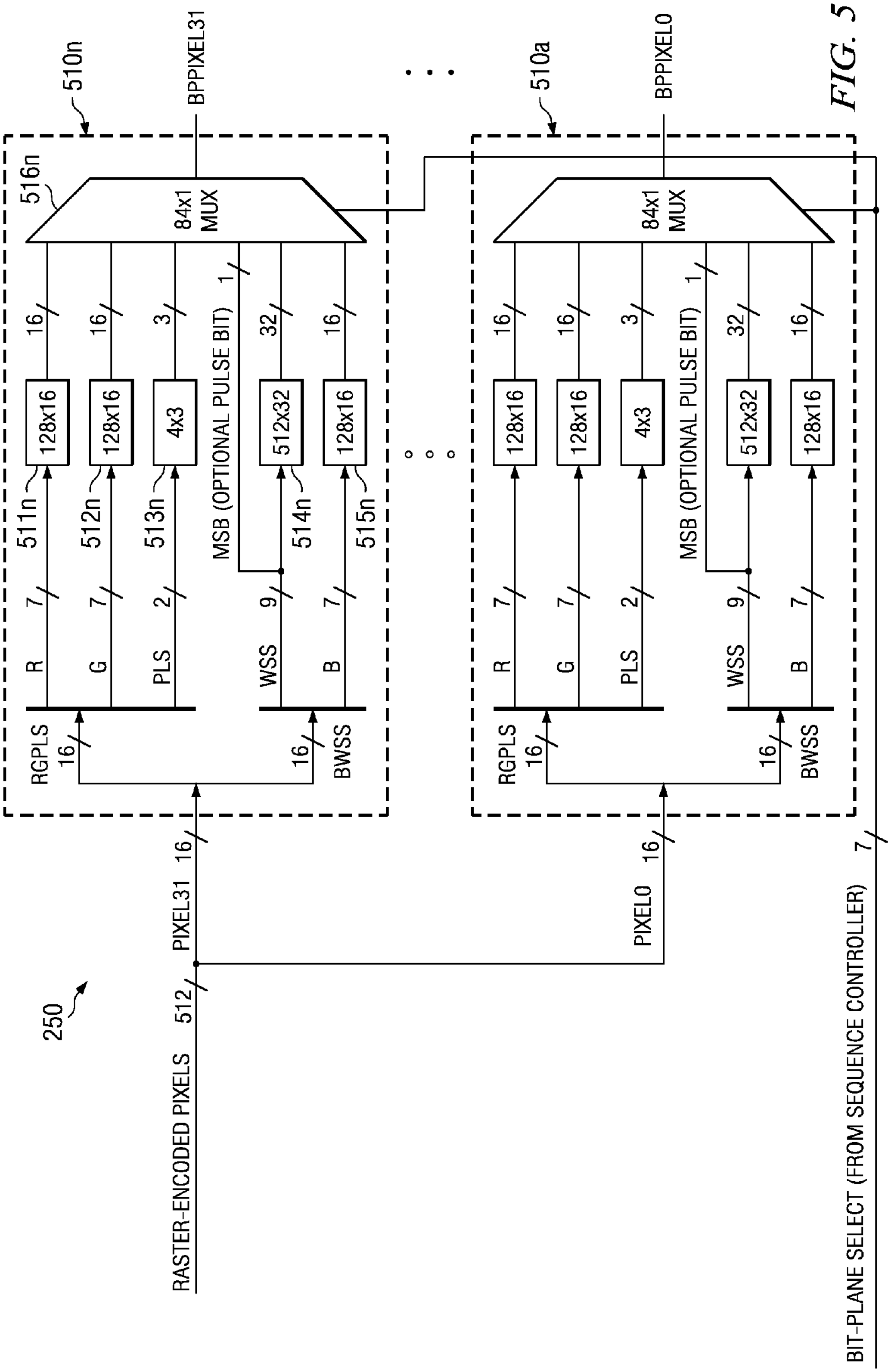
FIG. 5 illustrates a more detailed block diagram of one embodiment of the OTF raster decoder of FIG. 2.

FIG. 5 illustrates a more detailed block diagram of one embodiment of the OTF raster decoder 250 of FIG. 2. An incoming group of 32 16-bit raster-encoded half-pixels is allocated to 32 respective OTF raster decode units 510*a*, . . . , 510*n*. Each of the OTF raster decode units 510*a*, . . . , 510*n* is identical in the illustrated embodiment, so only the $32^{nd}$ OTF raster decode unit 510*n* will be described in detail.

The $32^{nd}$ OTF raster decode unit 510*n* receives, in successive intervals, the RGPLS and BWSS Words. The RGPLS and BWSS Words are then transformed into bit plane pixels using LUTs. Only a single bit plane is formed at a time for display on the DMD 14 of FIG. 1A. The seven bits of the RGPLS Word attributable to the R bits are provided to a 128×16 LUT 511*n* as shown, resulting in 16 candidate bit plane pixels. The seven bits of the RGPLS Word attributable to the G bits are provided to a 128×16 LUT 512*n*, also resulting in 16 candidate bit plane pixels. The two bits of the RGPLS Word attributable to the pulse bit planes are provided to a 4×3 LUT 513*n*, resulting in three candidate bit plane pixels. The nine bits of the BWSS Word attributable to the W, spoke and secondary color bits are provided to a 512×32 LUT 514*n* as shown, resulting in 32 candidate bit plane pixels. The seven bits of the BWSS Word attributable to the B bits are provided to a 128×16 LUT 515*n* as shown, resulting in 16 candidate bit plane pixels.

All 83 of the candidate bit planes for each pixel resulting from the LUTS 511*n*, 512*n*, 513*n*, 514*n*, 515*n* are provided to the mux 516*n*. The MSB of the nine bits of the BWSS Word attributable to the W, spoke and secondary color bit planes is also passed directly to the mux 516*n* in case the "Extra_Pulse_SEL," referred to above in conjunction with FIG. 3, selected the MSB of the three-bit group for inclusion in the BWSS Word. At this point, the mux 516*n* is provided with 84 bits, each one corresponding to a separate candidate bit plane pixel. Under control of a 7-bit Bit Plane Select signal received from the sequence controller 20 of FIG. 1A, the mux 516*n* selects one of the 84 bits and thereby selects one pixel's bit within a bit plane; the other 83 potential bits within a bit plane for that pixel are "discarded." Over the OTF raster decoder 250 as a whole, the mux 516*n* and the 31 unreferenced muxes cooperate to produce a 32-pixel portion of a selected bit plane. This 32-pixel portion is then provided to a corresponding group of pixels in the DMD (e.g., the DMD 14 of FIG. 1A) to effect an updating of those pixels.

Figure 6:
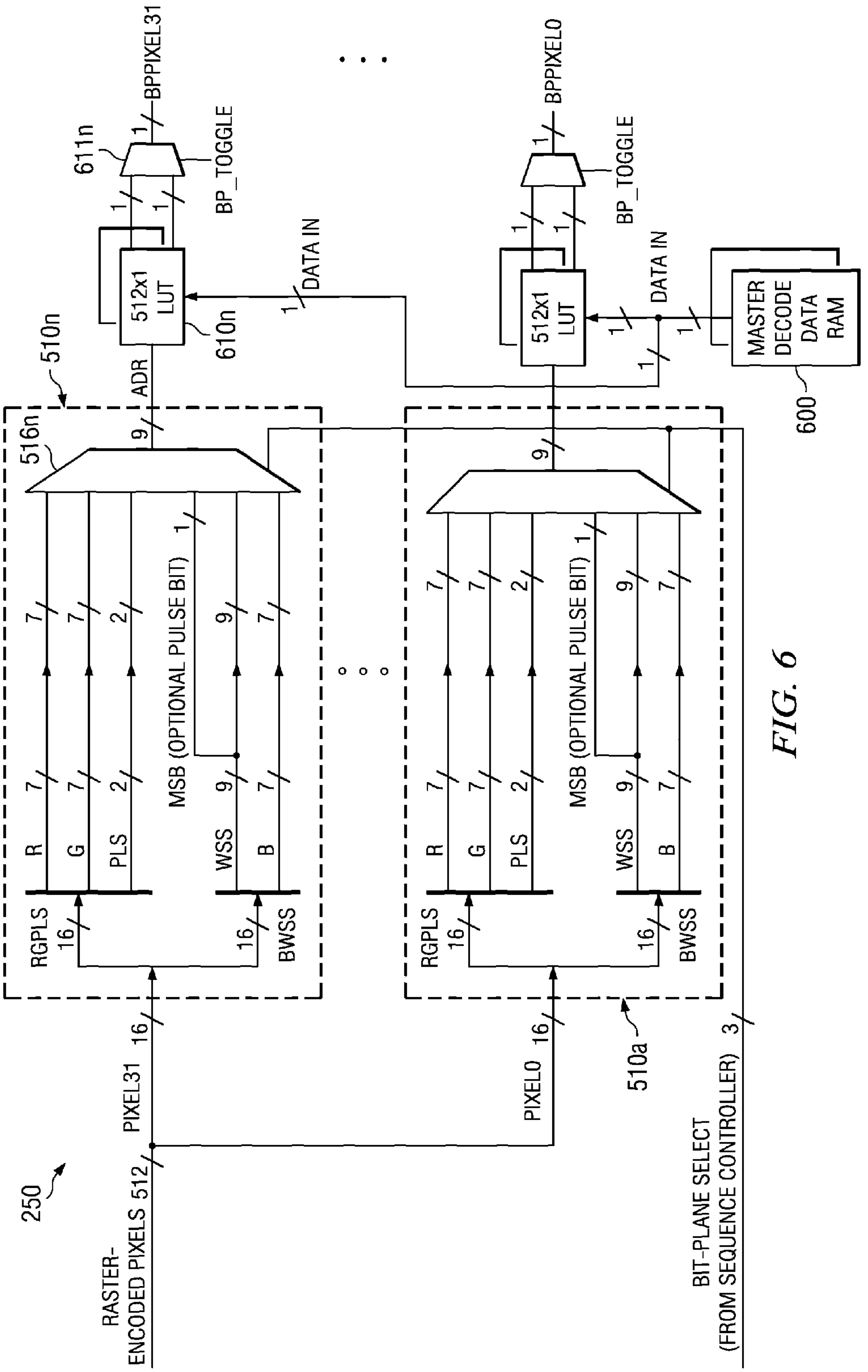
FIG. 6 illustrates a more detailed block diagram of another embodiment of the OTF raster decoder of FIG. 2.

It is apparent that the embodiment of the OTF raster decoder 250 of FIG. 5 employs a substantial number of relatively large LUTs. The LUTs are employed to produce a number of candidate bit plane portions (e.g., 84) from which only one bit plane portion is eventually selected. Since LUTs require process steps and area in an IC, it may be desirable to reduce the number of LUTs. FIG. 6 illustrates a block diagram of another embodiment of the OTF raster decoder 250 of FIG. 2 in which the number of LUTs is decreased. In general, the selection of bit planes is performed before transforming the pixel data into bit plane pixels. Shown are the 32 respective OTF raster decode units 510*a*, . . . , 510*n*. However, the OTF raster decode units 510*a*, . . . , 510*n* lack their respective LUTs. Since, as with FIG. 5, the OTF raster decode units 510*a*, . . . , 510*n* are identical, only the OTF raster decode unit 510*n* will be described.

Absent are the LUTS 511*n*, 512*n*, 513*n*, 514*n*, 515*n* of FIG. 5. Instead, the RGPLS and BWSS Words pass directly through to the mux 516*n* (note the dual-presence of the MSB, resulting in 33 total bits). Under control of a 3-bit Bit Plane Select signal, programmed during configuration of the frame store/format module 13 of FIG. 1A, the mux 516*n* selects nine of the 33 bits.

Instead of providing the dedicated LUTs of FIG. 5, the embodiment of FIG. 6 employs reconfigurable 512×1 double LUTs (e.g., the double LUTs 610*n*) for each of the OTF raster decode units 510*a*, . . . , 510*n*. Double LUTs are preferred for each OTF raster decode unit so one LUT can be loaded as the other one is used for look up. (Bit plane toggle muxes, e.g., 611*n*, selects between the double LUTs.) A master decode data random-access memory (RAM) is provided with all possible LUT contents. Under control of the sequence controller 20, the master decode data RAM loads the proper contents in one of each double LUT (e.g., 610*n*).

The nine bits selected by the mux 516*n* are provided to the double LUTs 610*n*. The double LUTs 610*n* produce a bit plane pixel. Over the OTF raster decoder 250 as a whole, the double LUT 610*n*, and the 31 unreferenced double LUTs cooperate to produce a 32-pixel portion of the selected bit plane. As in FIG. 5, this 32-pixel portion is then provided to a corresponding group of pixels in the DMD (e.g., the DMD 14 of FIG. 1A) to effect an updating of those pixels.

The nine bits selected by the mux 516*n* are provided to the double LUTs 610*n*. The double LUTs 610*n* produce a bit plane pixel. Over the OTF raster decoder 250 as a whole, the double LUT 610*n*, and the 31 unreferenced double LUTs cooperate to produce a 32-pixel portion of the selected bit plane. As in FIG. 5, this 32-pixel portion is then provided to a corresponding group of pixels in the DMD (e.g., the DMD 14 of FIG. 1A) to effect an updating of those pixels.

Figure 7:
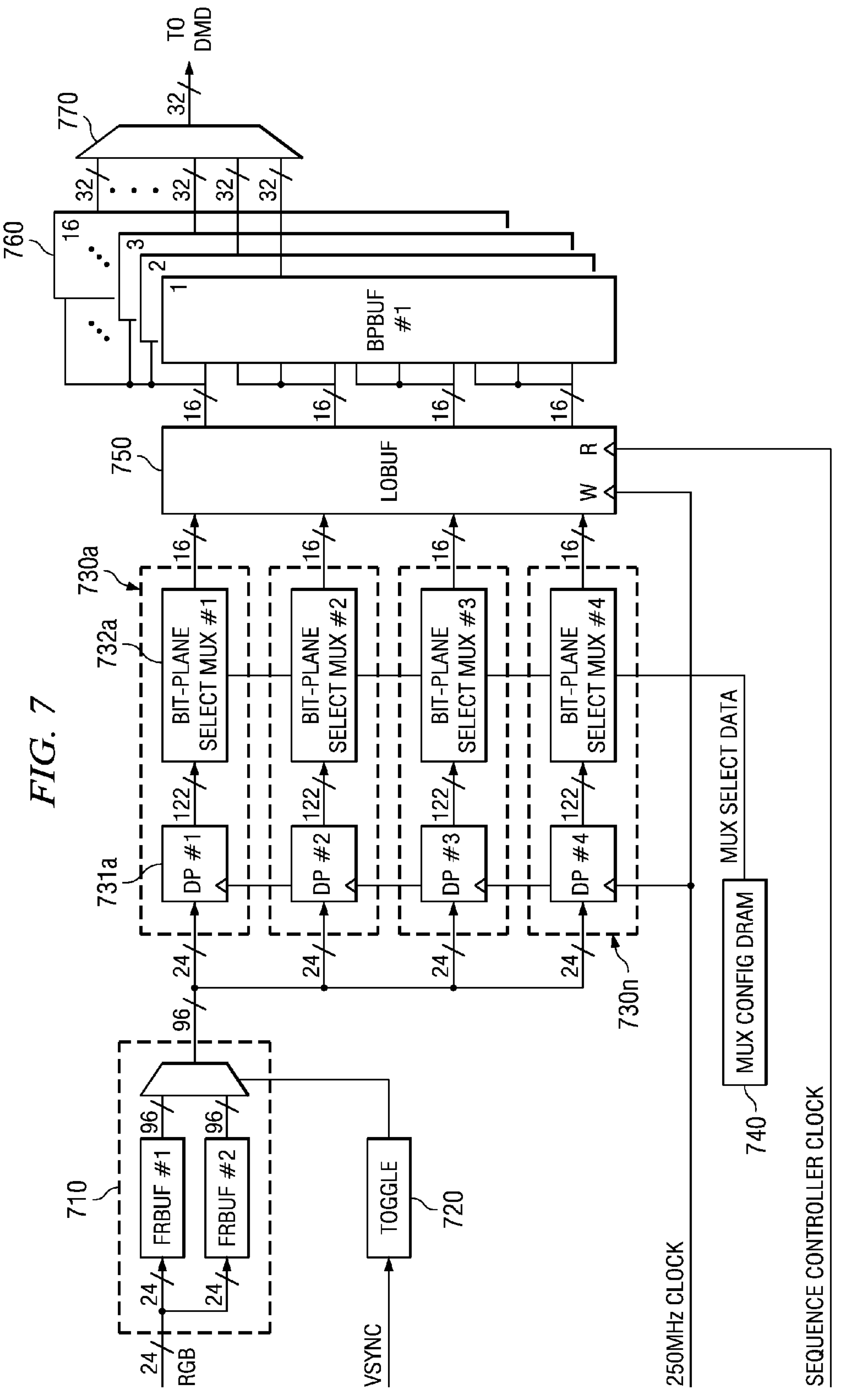
FIG. 7 illustrates a block diagram of another embodiment of a bit plane generating system for reducing SLM image memory size constructed according to the principles of the invention.

FIG. 7 illustrates a block diagram of another embodiment of a bit plane generating system for reducing SLM image memory size constructed according to the principles of the invention. The embodiment of FIG. 7 contrasts with that of FIG. 2 in that its memory requirements are further reduced, but its decoding is more complex. In FIG. 7, 24-bit uncompressed RGB pixel data, which may be "raw" RGB data, is provided to a double frame buffer 710. The double frame buffer 710 buffers the uncompressed RGB pixel data (e.g., four-wide, resulting in a 96-bit-wide data path). A VSYNC signal drives a toggle circuit 720 that acts as a selector with respect to the double frame buffer 710. It should also be noted that the storage capacity of the double frame buffer 710 may be less than 40 Mbits.

The 96-bit-wide data is split into (e.g., four) separate data paths 730*a*, . . . , 730*n*. This allows parallel processing for creating more bit plane data at the same time, making generating bit planes on-the-fly more practical, given today's IC technology. Otherwise, if a single datapath is used, it must run 4× faster which today's IC technology may not support. Each of the data paths 730*a*, . . . , 730*n* is identical in the illustrated embodiment, so only the 1st data path 730*a* will be described in detail. Unencoded RGB pixel data is provided to data path circuitry 731*a*. The data path circuitry 731*a* processes the RGB pixel data into bit planes and provides them on a bus (that is 122 bit planes wide in the illustrated embodiment) as shown. A mux configuration DRAM 740 (programmed during configuration of the frame store/format module 13 of FIG. 1A) provides signals that sequence through bit planes selections throughout a frame. A bit plane select mux 732*a* selects the same 16 bit planes for each data path channel, which is provided on four buses (e.g., 16-bits wide in the illustrated embodiment).

The selected 16-bit bit planes from the four data paths 730*a*, . . . , 730*n* are provided to an intermediate buffer "LOBUF" 750, which then provides its output to a temporary circular DRAM buffer illustrated as being embodied in 16 bit plane buffers 760. Rather than discarding candidate bit planes, as in the embodiment of FIG. 5, the 16 bit plane buffers 760 serve to hold the bit planes until they are needed. The bit planes selected for storing are the next 16 needed by the sequence controller. By holding the bit planes for the shortest amount of time possible, the sizes of the 16 bit plane buffers 760 can be minimized. In fact, the storage capacity of the 16 bit plane buffers 760 may be less than 16 Mbits in total.

The 16 bit plane buffers 760 store a corresponding set of 32-pixel wide words for the 16 bit planes. Each of the 16 buffers 760 has a portion of a unique bit plane. Under control of a select signal (not shown), a mux 770 selects the appropriate 32-pixel word from the appropriate bit plane. This 32-pixel portion is then provided to a corresponding group of pixels in the DMD (e.g., the DMD 14 of FIG. 1A) to effect an updating of those 32 pixels; the other 15 candidate 32-pixel portions are ignored until the time slot is reached for each of these to be displayed.

Those skilled in the pertinent art will understand that the number of bit planes generated "on-the-fly" can be increased without having to increase DRAM 710 capacity. Instead, the number of bit planes generated is largely dependent on the size of certain (usually static RAM, or SRAM) buffers used in temporary storage of portions (groups of pixels) of bit planes. However, those buffers are typically small compared to the memory (e.g., the DRAM 710) containing the pixel data.

Figure 8A:
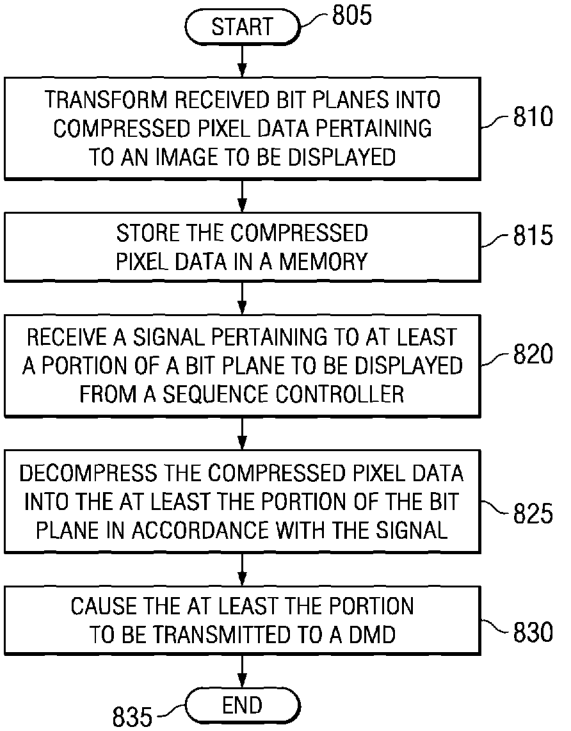
FIG. 8A illustrates a flow diagram of one embodiment of a bit plane compression method of reducing SLM image memory size carried out according to the principles of the invention.

FIG. 8A illustrates a flow diagram of one embodiment of a bit plane generating method carried out according to the principles of the invention. The method begins in a start step 805. In a step 810, received bit planes are transformed into compressed pixel data pertaining to an image to be displayed.

In a step 815, the compressed pixel data is stored in a memory. The memory may advantageously be embedded DRAM. The DRAM may have a storage capacity of less than 50 Mbits. In a step 820, a signal is received from a sequence controller. The signal pertains to at least a portion of a bit plane to be displayed.

In a step 825, the compressed pixel data is decompressed into the at least the portion of the bit plane in accordance with the signal. In doing so, the compressed pixel data may be transformed into a plurality of candidate bit plane portions from which one of the candidate bit plane portions is selected to be the at least the portion of the bit plane. Alternatively, the bit plane may first be selected and then the compressed pixel data decompressed into the at least the portion of the bit plane. In a step 830, the at least the portion is caused to be transmitted to a DMD for display. The method ends in an end step 835.

Figure 8B:
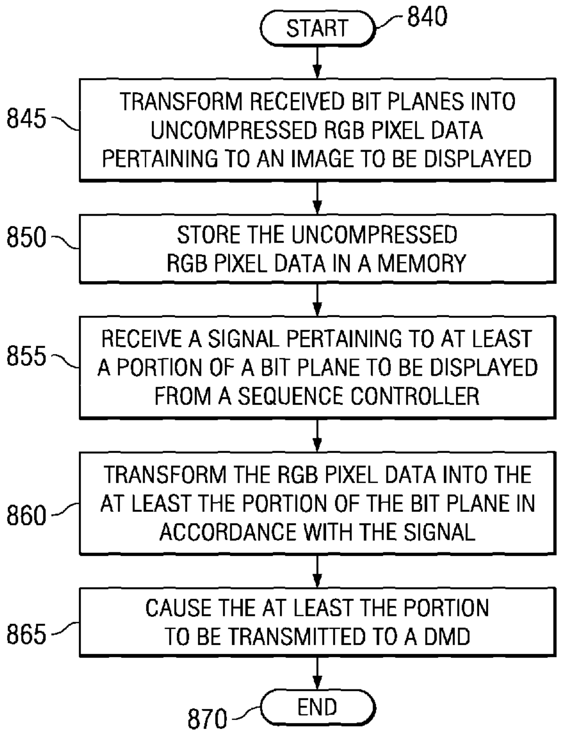
FIG. 8B illustrates a flow diagram of another embodiment of a bit plane compression method of reducing SLM image memory size carried out according to the principles of the invention.

FIG. 8B illustrates a flow diagram of another embodiment of a bit plane generating method carried out according to the principles of the invention. The method begins in a start step 840. In a step 845, received bit planes are transformed into uncompressed RGB pixel data pertaining to an image to be displayed.

In a step 850, the pixel data is stored in a memory. In a step 855, a signal is received from a sequence controller. The signal pertains to at least a portion of a bit plane to be displayed.

In a step 860, the pixel data is transformed into the at least the portion of the bit plane in accordance with the signal. The transforming may involve employing multiple data paths to transform the uncompressed RGB pixel data into multiple candidate bit plane portions, employing multiple bit plane buffers to store the plurality of candidate bit plane portions and thereafter selecting one of the candidate bit plane portions to be the at least the portion of the bit plane.

In a step 865, the at least the portion is caused to be transmitted to a DMD for display. The method ends in an end step 870.

Although the invention has been described in detail, those skilled in the pertinent art should understand that they can make various changes, substitutions and alterations herein without departing from the scope of the invention in its broadest form.

What is claimed is:

1. A bit plane generating system, comprising:

a memory configured to store pixel data pertaining to an image to be displayed; and bit plane decoding circuitry coupled to said memory and configured to transform said pixel data into at least a portion of a bit plane in accordance with a signal received from a sequence controller;

wherein said pixel data is compressed pixel data and said bit plane decoding circuitry comprises a raster decoder coupled to said memory and configured to transform said compressed pixel data into a plurality of candidate bit plane portions and thereafter select one of said candidate bit plane portions to be said at least said portion of said bit plane.

2. The bit plane generating system as recited in claim 1 wherein said memory is a dynamic random access memory having a storage capacity of less than 50 Mbits.

3. A bit plane generating system, comprising:

a memory configured to store pixel data pertaining to an image to be displayed; and bit plane decoding circuitry coupled to said memory and configured to transform said pixel data into at least a portion of a bit plane in accordance with a signal received from a sequence controller;

wherein said pixel data is compressed pixel data and said bit plane decoding circuitry comprises a raster decoder coupled to said memory and configured to select a bit plane to be generated and thereafter transform said compressed pixel data into said at least said portion of said bit plane.

4. The bit plane generating system as recited in claim 3 wherein said memory is a dynamic random access memory having a storage capacity of less than 50 Mbits.

5. A method of generating a bit plane, comprising:

storing pixel data pertaining to an image to be displayed in a memory;

receiving a signal from a sequence controller pertaining to at least a portion of a bit plane to be displayed; and transforming said pixel data into said at least said portion of said bit plane in accordance with said signal;

wherein said pixel data is compressed pixel data and said transforming comprises:

transforming said compressed pixel data into a plurality of candidate bit plane portions; and thereafter selecting one of said candidate bit plane portions to be said at least said portion of said bit plane.

6. The method as recited in claim 5 wherein said memory is a dynamic random access memory having a storage capacity of less than 50 Mbits.

7. A method of generating a bit plane, comprising:

storing pixel data pertaining to an image to be displayed in a memory;

receiving a signal from a sequence controller pertaining to at least a portion of a bit plane to be displayed; and transforming said pixel data into said at least said portion of said bit plane in accordance with said signal;

wherein said pixel data is compressed pixel data and said transforming comprises:

selecting a bit plane to be generated; and thereafter transforming said compressed pixel data into said at least said portion of said bit plane.

8. The method as recited in claim 7 wherein said memory is a dynamic random access memory having a storage capacity of less than 50 Mbits.

9. A method of generating a bit plane, comprising:

transforming received bit plane data into compressed pixel data pertaining to an image to be displayed;

storing the compressed pixel data in a memory;

receiving a signal from a sequence controller pertaining to at least a portion of a bit plane to be displayed; and selecting a bit plane to be generated; and generating the selected bit plane by decompressing the compressed pixel data into the at least the portion of the bit plane in accordance with the signal.

10. The method as recited in claim 9 wherein said memory is a dynamic random access memory having a storage capacity of less than 50 Mbits.

11. A method of generating a bit plane, comprising:

transforming received bit plane data into compressed pixel data pertaining to an image to be displayed;

storing the compressed pixel data in a memory;

receiving a signal from a sequence controller pertaining to at least a portion of a bit plane to be displayed;

decompressing the compressed pixel data into a plurality of candidate bit plane portions; and selecting one of the candidate bit plane portions as the at least the portion of the bit plane in accordance with the signal.

12. The method as recited in claim 11 wherein said memory is a dynamic random access memory having a storage capacity of less than 50 Mbits.

* * * * *